US006546482B1

(12) United States Patent
Magro et al.

(10) Patent No.: US 6,546,482 B1
(45) Date of Patent: Apr. 8, 2003

(54) INVALID CONFIGURATION DETECTION RESOURCE

(75) Inventors: James R. Magro, Austin, TX (US); David F. Tobias, Pflugerville, TX (US); Daniel P. Mann, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/306,871

(22) Filed: May 7, 1999

(51) Int. Cl.$^7$ ............................................. G06F 15/177
(52) U.S. Cl. ............................... 713/1; 713/100; 710/8; 710/10
(58) Field of Search ........................ 713/1, 100; 710/8, 710/10

(56) References Cited

U.S. PATENT DOCUMENTS

| | | | | |
|---|---|---|---|---|
| 5,386,515 A | * | 1/1995 | Martin et al. .................... | 710/5 |
| 5,668,943 A | * | 9/1997 | Attanasio et al. .............. | 714/15 |
| 5,884,060 A | * | 3/1999 | Vegesna et al. .............. | 712/215 |
| 5,964,871 A | * | 10/1999 | Hester et al. ................... | 713/1 |
| 6,092,163 A | * | 7/2000 | Kyler et al. .................. | 711/152 |
| 6,101,627 A | * | 8/2000 | Shimomura et al. ........... | 714/10 |
| 6,105,145 A | * | 8/2000 | Morgan et al. .............. | 713/501 |
| 6,161,150 A | * | 12/2000 | Sudhakaran et al. ........... | 710/8 |

OTHER PUBLICATIONS

*Intel Architecture Software Developer's Manual, vol. 3: System Programming Guide*, Appendix A—Performance Monitoring Events, Intel Corp. (1997) 23 pages.

*Intel Performance Evaluation & Analysis Kit—1394 Toolkit*, Intel Corp., 2 pages, http://developer.intel.com/design/ipeak/1394.

*Intel Performance Evaluation & Analysis Kit—ID Monitor: A WDM IO Monitoring Tool*, Intel Corp., 2 pages, http://developer.intel.com/design/ipeak/iomon.

\* cited by examiner

*Primary Examiner*—Thomas Lee
*Assistant Examiner*—James K. Trujillo
(74) *Attorney, Agent, or Firm*—Meyertons Hood Kivlin Kowert & Goetzel, P.C.; B. Noël Kivlin

(57) ABSTRACT

An invalid configuration detection resource for identifying and reporting conflicts between system resources of a microcontroller or other device is provided. Selected system registers within each resource are monitored by discrete hardware logic within the invalid configuration detection resource. For each resource, a status register provides an encoding of the configuration for that resource. The invalid configuration detection resource then compares the status registers for invalid combinations, and encodes this information in a system status register. Alternatively, the invalid configuration detection resource monitors each selected system register, independent of the resource to which it belongs. Improper combinations of registers are then encoded in a system status register. An alternative embodiment uses software to replace the discrete hardware logic with a table that specifies invalid register combinations. The invalid configuration detection resource further provides a software-controlled bit mask register.

11 Claims, 8 Drawing Sheets

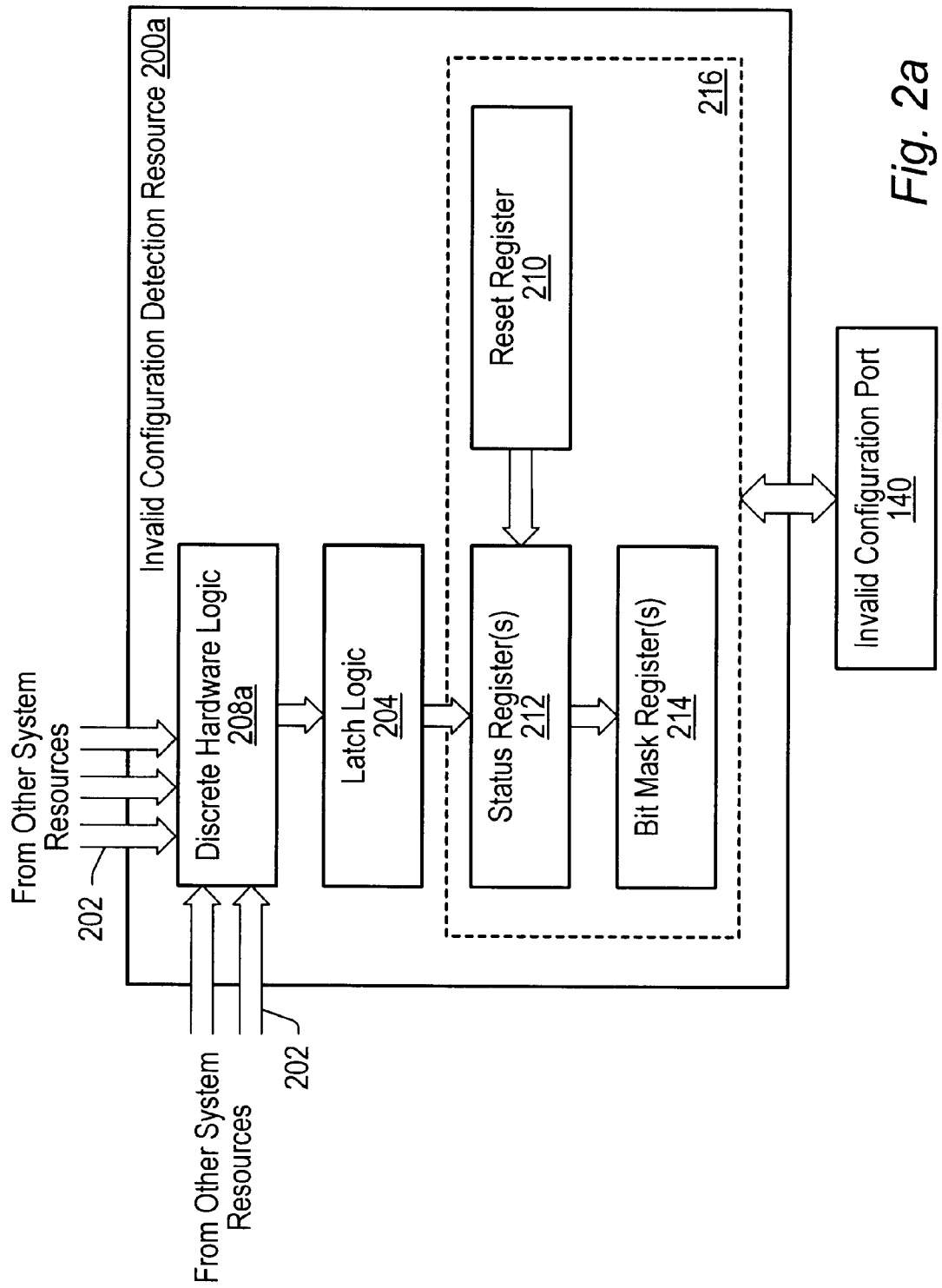

INVALID CONFIGURATION DETECTION RESOURCE

BACKGROUND OF THE INVENTION

1. Field of the Invention

The invention relates to microcontrollers having registers associated with different resources contained therein and, more particularly, to a method for efficiently identifying and disclosing invalid register configurations in such systems.

2. Description of the Related Art

As microcontrollers become more and more complex, the number of resources that make up the microcontroller has grown. The increase in system resources, coupled with increasing processor clock speeds, has placed new burdens on system developers and complicated the task of debugging new systems. For each new resource contained within a microcontroller or other processor-oriented system, numerous resource registers may be maintained.

Many system resources require management of a large number of registers. For example, typical systems that support dynamic memory access, or DMA, are required to maintain many DMA registers. DMA command registers, DMA mode registers, DMA request registers, DMA mask registers, DMA address registers, and DMA page registers are usually included in a microcontroller.

Some microcontrollers are designed such that alternative configurations are available, enabling the user to tailor the microcontroller to its intended use. For example, the Elan SC400 microcontroller, a product of Advanced Micro Devices, of Sunnyvale, Calif., dedicates some microcontroller pins to either add DRAM address/bank control signals or add keyboard functions, but not both at the same time. A user who tries to enable both the expanded DRAM functionality and the additional keyboard functions may have difficulty discerning the problem.

Additionally, different resources within a microcontroller may be designed to share a signal bus. A user unfamiliar with the nuances of the programming requirements could improperly write to multiple devices. Again, such errors may be difficult to discover and correct.

Different resources within a microcontroller are often developed and maintained by different design teams, sometimes not even within the same company. This decentralization of design teams has not been well-suited to debugging of system resources. The need to provide support for developing and debugging a system is particularly acute within the embedded products industry, where specialized on-chip circuitry is often combined with a processor core.

System resources are typically debugged with only the resource itself in mind. When one resource is debugged, the other resources of the system are ignored. Because of the decentralization of resource development, consideration of conflicts between resources may not occur until late in the development process. Furthermore, the problem of identifying resource conflicts is exacerbated by the fact that system resource registers frequently are programmed dynamically. For software designers of complex microcontrollers, such issues present difficult challenges.

As a result of shrinking silicon process geometries, more circuitry may be added to an existing microcontroller design without increase in die size, manufacturing costs, or power dissipation. There is a growing trend for a portion of the additional capability to be used to monitor the integrated functions using built-in hardware. This gives hardware some knowledge of itself, and permits the hardware to have a greater role in self-management. The result is earlier problem determination at the system level, resulting in more robust overall product designs.

SUMMARY OF THE INVENTION

A microcontroller according to the present invention includes an invalid configuration detection resource. An invalid configuration detection resource permits systematic identification of conflicts between system resources during development of a particular resource within a system. The programmer/system designer of a particular resource can develop the resource without concern for other resources in the system.

In one embodiment, the invalid configuration detection resource approaches each resource, one by one. Once the resource is initialized, the invalid configuration detection resource, using either hardware, such as state machine of combinatorial logic, or firmware, checks "externalities" of that resource, that is, registers outside the resource which cause conflicts for that resource. A resource-specific status register is then programmed with the results of the check.

After all resources are initialized and checked in a like manner, the invalid configuration detection resource, again using hardware or firmware, determines, based upon each resource status register value, whether the system contains an invalid configuration. A system status register is programmed with the results of this check.

A second embodiment of the invalid configuration detection resource also begins by focusing on each resource of the microcontroller separately. In this embodiment, following the configuration of each resource, the invalid configuration detection resource, using hardware or firmware, sets a resource-specific status register, based upon the configuration that occurred. For each possible configuration of the resource, a different value is programmed into the dedicated resource status register.

The invalid configuration detection resource then, using discrete hardware logic, such as state machine or combinatorial logic, or firmware, determines whether the system contains an invalid configuration, based upon the values contained in each resource status register. A system status register is then programmed with the results of this check.

In a third embodiment, the invalid configuration detection resource does not detect configuration conflicts based upon resources, but instead looks at selected system registers. Invalid combinations of two or more registers result in a bit being set in a system status register. Alternatively, the system status register may be programmed with a unique value for each invalid configuration found.

The invalid configuration detection resource further may contain one or more bit mask registers. A bit mask register allows certain resource or system status register values to trigger an interrupt. After the interrupt is polled by a processor of the microcontroller, the system debugger is informed by the bit mask register of which resource or system register caused the interrupt.

The invalid configuration detection resource includes reset logic that enables a user to reset the status registers. In this way, a user may initialize the invalid configuration detection resource for a new debug session after a configuration analysis is complete.

The invalid configuration detection resource may also contain latch logic so that, once an invalid configuration is detected, the associated status register will be latched to a predetermined value. This ensures that the invalid configuration is reflected in the invalid configuration detection resource and is only cleared upon reset by the user.

The invalid configuration detection resource may also include a software development port. This port permits dedicated access to the invalid configuration detection resource during debug of the system.

Thus, an invalid configuration detection resource permits a developer or debugger to systematically identify conflicts between two or more resources or, alternatively, between two or more registers in a microcontroller.

BRIEF DESCRIPTION OF THE DRAWINGS

A better understanding of the present invention can be obtained when the following detailed description of the preferred embodiment is considered in conjunction with the following drawings, in which:

FIG. 2a is a block diagram of the components of an embodiment of the invalid configuration detection resource of FIG. 1 according to the present invention;

DETAILED DESCRIPTION OF THE PREFERRED EMBODIMENT

Figure 1:
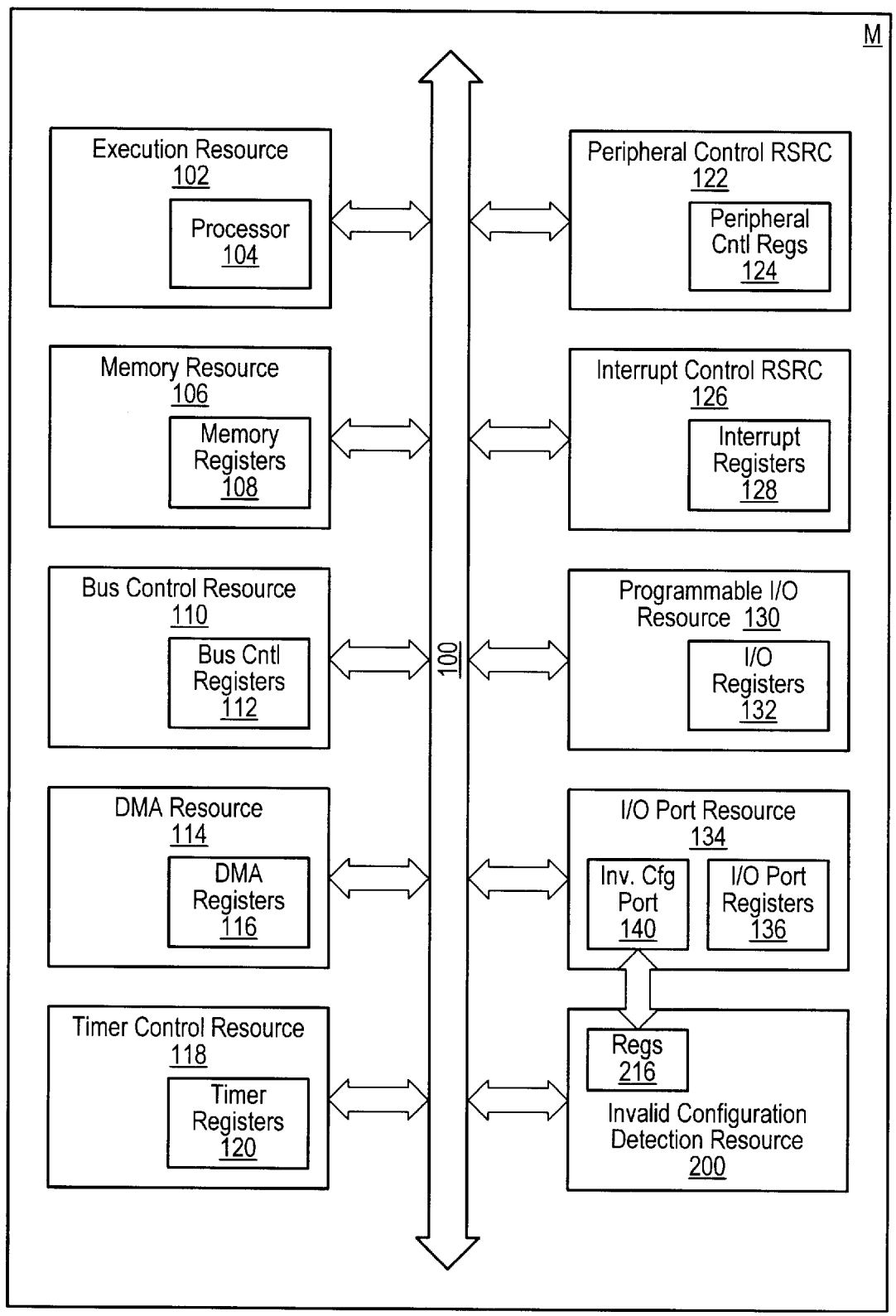
FIG. 1 is a block diagram of an exemplary processor-oriented system incorporating an invalid configuration detection resource in accordance with the present invention.

Turning now to the drawings, FIG. 1 shows a block diagram of an exemplary architecture for a microcontroller M in accordance with the present invention. The microcontroller M is comprised of a number of resources, each shown as a separate unit.

A variety of configurations and combinations of these resources of the microcontroller M are possible. The microcontroller M, for example, could be the Am186™ ED microcontroller, the Elan™ SC400 microcontroller, or the Am186™ CC microcontroller.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution resource with added functionality all implemented on a single monolithic integrated circuit.

The microcontroller M may support a variety of on-chip resources. The illustrated architecture includes an execution resource 102, a memory resource 106, a bus control resource 110, a direct memory access (DMA) resource 114, a timer control resource 118, a peripheral control resource 122, an interrupt control resource 126, a programmable I/O resource 130, an I/O port resource 134, and an invalid configuration detection resource 200. Each resource is coupled to a system bus 100. The system bus 100 may include a data bus, an address bus, and a control bus for communicating data, addresses and control information between any of these coupled resources.

The execution resource 102 may provide a highly integrated processor 104 for executing code stored by the memory resource 106. The execution resource 102 in the disclosed embodiment is compatible with the Am186 instruction set implemented in a variety of microcontrollers from Advanced Micro Devices, Inc. of Sunnyvale, Calif. A variety of other execution resources could be used instead of the execution resource 102.

The memory resource 106 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and/or synchronous DRAM (SDRAM) support, write buffering support, and read-ahead buffering support. A plurality of memory registers 108 is shown within the memory resource 106.

The bus control resource 110 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. By programming the bus control registers 112, the bus control resource 110 permits the microcontroller M to support a number of external buses and peripherals.

The DMA resource 114 may provide multiple DMA controllers for controlling direct memory access transfers between the resources of the microcontroller M. Each DMA controller may have several DMA channels that are part of the DMA registers 116. The timer control resource 118 provides timer registers 120 that, for example, may be programmed as counters by system software.

The peripheral control resource 122 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards. The peripheral control registers 124 are provided for flexible programming of peripheral devices.

The interrupt control resource 126 may provide multiple interrupt controllers for supporting several interrupt requests. Using the interrupt control registers 128, each interrupt controller may regulate issuance and acceptance of its associated interrupt requests. The programmable I/O resource 130 supports several general-purpose I/O pins and I/O registers 132. These pins provide a parallel interface for external devices to the microcontroller M.

Using I/O port registers 136, the I/O port resource 134 may provide a standard parallel port interface, serial port interface, and/or infrared port interface. The parallel port interface may support an enhanced parallel port (EPP) mode for high-speed transfers. The serial port interface and infrared interface may be driven by an industry-standard universal asynchronous receiver/transmitter (UART) so as to permit PC compatibility.

The invalid configuration detection resource 200 of the present invention provides dedicated registers 216 for quickly determining incompatibilities between the registers of the system resources. The invalid configuration detection resource 200 may be accessed via the invalid configuration port 140, shown as part of the I/O port resource 134. The invalid configuration port 140 is a dedicated port for accessing all registers of the invalid configuration detection resource 200. The registers 216 may include resource status registers, system status registers, bit mask registers, and reset registers (not shown). The registers 216 of the invalid configuration detection resource 200 and the invalid configuration port 140 are described in more detail below.

It should be understood that the disclosed resources are illustrative and not exhaustive. A number of the illustrated resources could be eliminated, or added to, without detracting from the spirit of the invention. Further, selection of the particular resources supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

As FIG. 1 shows, many of the resources coupled to the system bus 100 include registers. Access to the register set of each system resource may be unique. Further, for each system resource, its registers are potentially monitored or programmed by a variety of developers. These developers may include hardware developers, who, at a minimum, initialize the resource to some operating state; ROM developers, who program the resource to some initial state during power-up; application programmers, whose programs utilize the resource; and driver developers, who provide an interface to the application programmers, to name a few. Due to the large number of potential developers and the large number of system resources, management and debug of the registers in a microcontroller may be cumbersome. The registers for the various system resources generally are referred herein as system resource registers.

FIG. 2a is a block diagram of one embodiment of an exemplary invalid configuration detection resource 200a. The invalid configuration detection resource 200a provides discrete hardware logic 208a. The discrete hardware logic 208a may be state machine or combinatorial logic. The discrete hardware logic 208a receives as input registers from other system resources, as shown by arrows 202. Although FIG. 2a shows the discrete hardware logic 208a as receiving input from five system resources, any number of system resources can provide such input.

The purpose of the discrete hardware logic 208a is to detect combinations of register configurations that are improper. The discrete hardware logic 208a may take the form of state machine logic to identify improper combinations or invalid configurations of selected system registers. Or, the discrete hardware logic 208a may be made up of combinatorial logic which includes a set of encoders and a set of comparators. System designers of ordinary skill recognize a number of possible embodiments for the discrete hardware logic 208a.

Once improper combinations are detected, the discrete hardware logic 208a updates one of the status registers 212. Thus, in FIG. 2a, the discrete hardware logic 208a is coupled to status registers 212. When an improper combination or invalid configuration is detected, the discrete hardware logic 208a causes a change in one of the status registers 212.

The status registers 212 can be updated in a number of ways. For example, the invalid configuration detection resource 200a may associate a value or data pattern with each improper combination. Alternatively, the invalid configuration detection resource 200a may couple each improper combination with a bit in a status register.

Also shown in the invalid configuration detection resource 200a is latch logic 204. The latch logic 204 is coupled to the discrete hardware logic 208a. The latch logic 204 insures that once a bit is set in a status register 212, the bit remains set until a reset of the status register 212 is invoked by the system debugger.

The status register 212 is one of several registers 216 that may be found in the invalid configuration detection resource 200a. Also shown in FIG. 2a is reset register 210 coupled to status registers 212. Reset register 210 provides a way for the system debugger to control the invalid configuration detection resource 200a. The reset register 210 may be configured to reset all status registers 212 at once or any one of them by writing a predetermined value to the reset register 210. System designers skilled in the art will recognize a number of ways that a reset function can be invoked.

During initial firmware power-up, or after several hours or operation, the system may hang as a result of incorrect resource configuration. In this event, no invalid configuration handler can run. To support debug of this scenario, the latched contents of the status register 212 should not be reset by a master reset signal of the system, but may preferably only be reset using the reset register 210 of the invalid configuration detection resource 200a. Thus, when the device is reset, system firmware can query the latched contents of the status register 212 to determine if an invalid configuration was responsible for a previous crash. System firmware can subsequently clear the status register 212 by writing to the reset register 210 of the invalid configuration detection resource 200a.

The bit mask register or registers 214 enables a change in one of the status registers 212 of the invalid configuration detection resource 200a to generate processor interrupts. The bit mask register 214 thus is shown coupled to the status register 212. The invalid configuration detection resource 200a may have one or several bit mask registers 214, as needed.

Suppose a bit mask register 214, for example, is coupled to a status register 212 such that each bit of the status register 212 is identified with a single bit of the bit mask register 214. Under software control, the bit mask register 214 may be programmed so that whenever the specified status register 212 changes, a processor interrupt results. Alternatively, the bit mask register 214 may be programmed so that whenever any bit or two bits of the specified status register 212 changes, a processor interrupt results. A more thorough discussion of the bit mask register 214 follows, in conjunction with the descriptions of FIGS. 4a and 4b.

The registers 216 of the invalid configuration detection resource 200a are shown coupled to the invalid configuration port 140. The invalid configuration port 140 is a dedicated port for accessing all registers of the invalid configuration detection resource 200a.

Although FIG. 1 depicts system resources in a microcontroller, because the embodiment of FIG. 2a uses combinatorial logic 208a, the invalid configuration detection resource 200a may be practiced in systems which have no microcontrollers. In fact, any systems which contain registers may benefit using the invalid configuration detection resource 200a. For example, many peripheral devices operate using registers which are not coupled to a microcontroller. For example, most serial port UART peripheral devices contain no microcontrollers. Thus, it is to be understood that the invalid configuration detection resource 200 a may operate in a microcontroller-free environment.

Figure 2B:
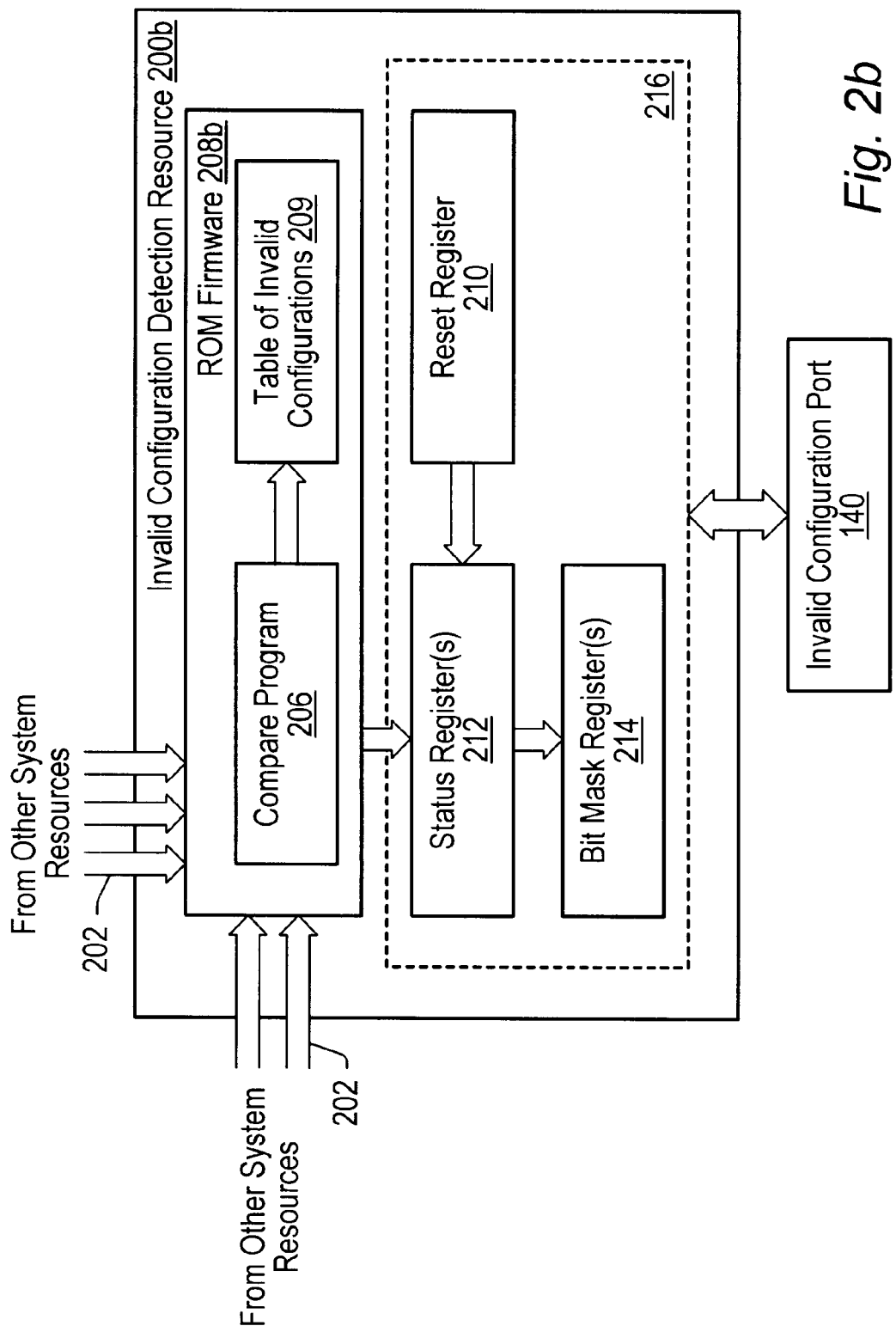
FIG. 2b is a block diagram of the components of a second embodiment of the invalid configuration detection resource of FIG. 1 according to the present invention.

FIG. 2b is a block diagram of an alternative embodiment of an exemplary invalid configuration detection resource 200b. In this embodiment, the discrete hardware logic 208a and latch logic 204 have been replaced with ROM firmware 208b. Within the ROM firmware 208b is a compare program 206 and a table of invalid configurations 209. The compare program 206 reads the registers of the various system resources and compares their values to the values contained in the table of invalid configurations 209. Alternatively, the compare program 206 may read every entry of the table of invalid configurations 209 and then read the system resource registers to find an invalid configuration. Although this embodiment uses firmware stored in a ROM, it is understood that the invalid configuration detection resource 200b can effectively be implemented using other embodiments, including flash ROM, SMI RAM, and other firmware-based implementations, without departing from the spirit of the invention.

The compare program 206 may be located in volatile memory or ROM. If the program 206 identifies an invalid configuration it sets a bit in the status register 212. Thus, like the discrete hardware logic 208a of FIG. 2a, the status register 212 is updated either with a bit change or a value representing the invalid configuration. The remaining components of the invalid configuration detection resource 200b are of like structure and operation as the corresponding components shown in FIG. 2a and bear the same reference numerals.

Figure 2C:
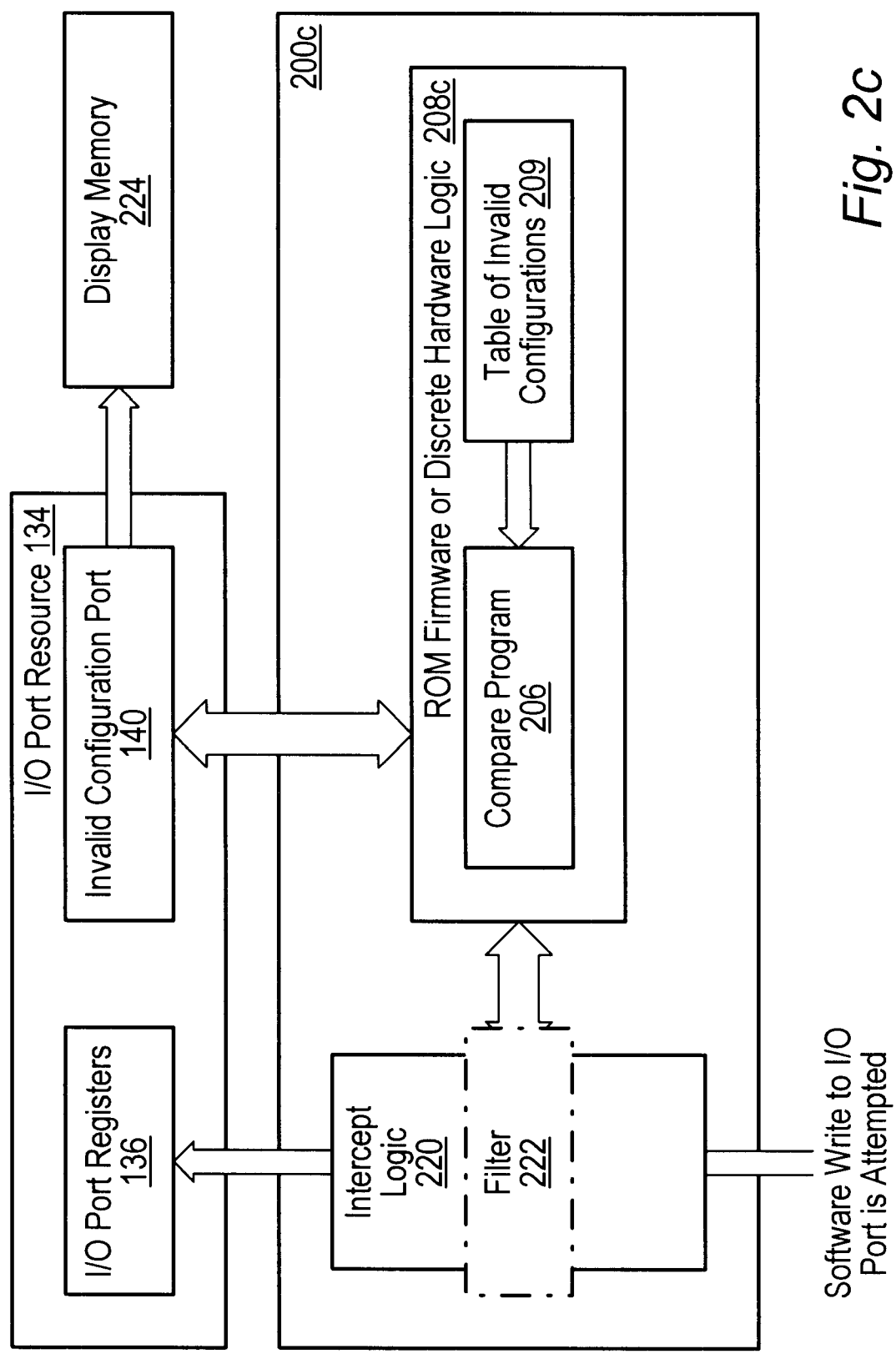
FIG. 2c is a block diagram of the components of a third embodiment of the invalid configuration detection resource of FIG. 1 according to the present invention.

In another embodiment, invalid register combinations could explicitly be disallowed using the invalid configuration detection resource 200c, as shown in FIG. 2c. Any requests by software to configure a resource first pass through a central decision point, shown as intercept logic 220. The intercept logic 220 sends a request to a central decision point 208c, which may be implemented using the combinatorial logic 208a of FIG. 2a or using firmware 208b of FIG. 2b. Using the intercept logic 220, the invalid configuration detection resource 200c can thus track configuration settings as they are attempted. The invalid configuration detection resource 200c thus has complete knowledge of the state of the I/O logic. Any new setting attempts that conflict with an existing setting are disallowed. The central decision logic 208c may then send an error notification to the dedicated invalid configuration port 140.

This type of error checking could potentially slow down system operation if all I/O had to go through the intercept logic 220. Thus, an optional I/O filter 220 is provided so that only certain I/O addresses are monitored. All other I/O accesses instead go "straight through" to the I/O port registers 136, as expected.

Use of a firmware-based system potentially provides for powerful error reporting. For example, using the dedicated invalid configuration port 140, the firmware may send a text message to display memory 224 to be ultimately received by a debug terminal (not shown) in simple English. The text preferably states exactly which I/O request had been denied, the address of the request in memory, and a specific reason for denial. A further advantage of the method illustrated by FIG. 2c is that the system does not crash due to an invalid configuration since no such configuration is permitted. Furthermore, if firmware is used, the firmware may be updated to allow end-product-level definition of what an invalid configuration is. This is an important feature when using an "invalid setting detection" enabled device with other external components that do not have this capability. For example, if a device is located on an external bus, and uses an external address decoder, it would be advantageous for such a device to know that a conflict exists when attempting to open a PCMCIA window at the same address, for example. (The Eaan SBC 400, a product of Advanced Microdevices, is such a device.) This type of conflict varies greatly from system to system. Thus, an adaptable solution such as one using firmware is preferable. However, leveraging existing on-chip invalid configuration setting resources to detect and report invalid settings at the system level is advantageous.

Figure 3A:
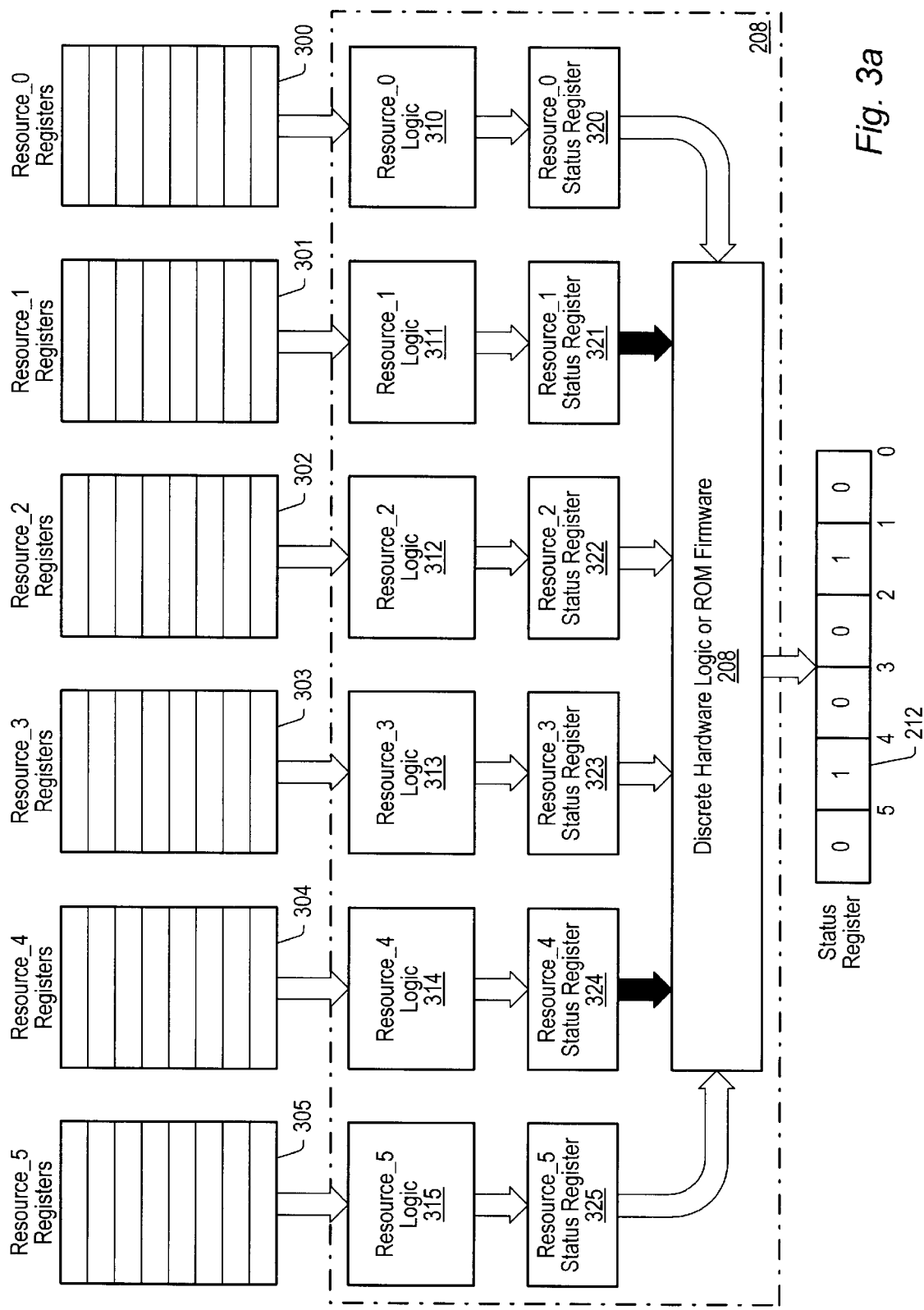
FIG. 3a is a functional block diagram showing how the invalid configuration detection resource of FIG. 1 works according to one embodiment of the present invention.
Figure 3B:
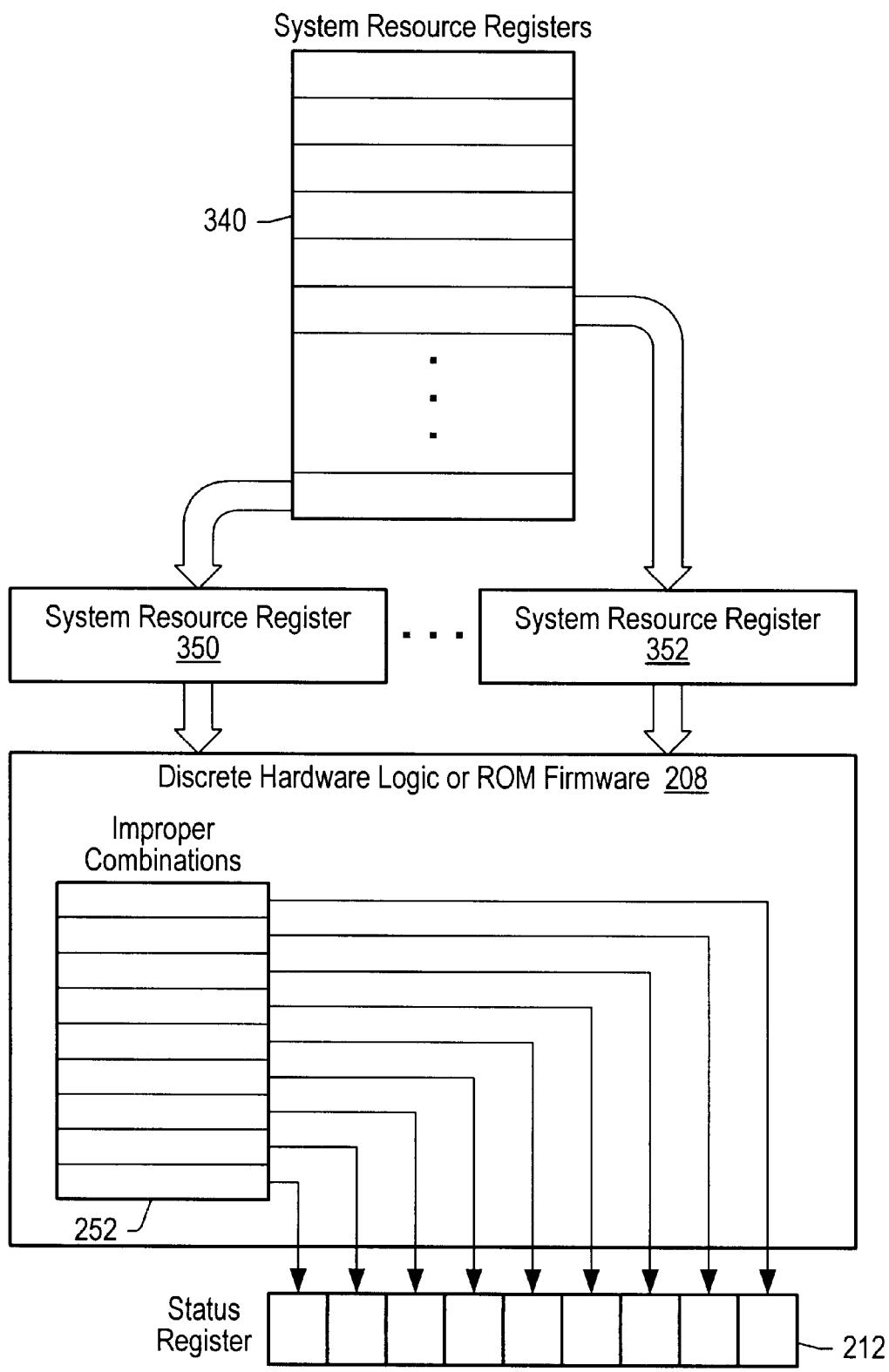
FIG. 3b is a functional block diagram showing how the invalid configuration detection resource of FIG. 1 works according to a second embodiment of the present invention.

FIGS. 3a and 3b are two functional block diagrams which take a closer look at how the logic 208, either the discrete hardware logic 208a or the firmware 208b may operate in an exemplary system.

In the embodiment shown in FIG. 3a, the system registers are grouped by resource. Six sets of system resource registers are shown, starting with resource_0 registers 300, resource_1 registers 301, resource_2 registers 302, resource_3 registers 303, resource_4 registers 304, resource_5 registers 305. In this embodiment, the discrete hardware logic 208a is split into groups by resource. Resource_0 logic or firmware 310 reads resource_0 registers 300 and determines the status for resource_0, to be stored in resource_0 status register 320. Then, resource_1 logic or firmware 311 reads resource_1 registers 301 and determines the status for resource_1, to be stored in resource_1 status register 321. The remaining system resource registers 302–305 are coupled to resource logic 312–315, which are themselves coupled to resource status registers 322–325 in like structure and operation as the resource_0 and resource_1 circuitry herein described. Finally, all status registers 320–325 are updated, each with the status for the resource with which it is associated.

There are several methods for determining the status of a resource. First, the logic for each resource can associate a different status value with each possible configuration of that resource. In this manner, the status register for each resource contains an encoding of the configuration of the resource. For microcontroller configurations in which the resources can be selectively enabled, the status register associated with each resource can be examined.

Alternatively, the logic for each resource can check for "externalities" to that resource. That is, the logic for each resource determines whether registers, external to that resource, are configured such that they create problems for that resource and are thus considered invalid by that resource. Again, the status register may be updated accordingly, with an encoding of the offending externality. A number of other methods for determining the status of a resource are possible.

In FIG. 3a, each status register for each resource 320–325 is coupled to the discrete hardware logic or ROM firmware 208a. The ultimate task of this logic is to identify and report invalid configurations in microcontroller M. How this logic works depends upon how the status registers 320–325 are defined, as described above.

The discrete hardware logic or ROM firmware 208 is coupled to status register 212. In this embodiment, each bit of status register 212 identifies an invalid configuration from one of the six resources shown. Alternatively, the status register 212 could be configured to contain a value which represents an invalid configuration for the microcontroller M, each invalid configuration having a unique value associated with it. In FIG. 3a, bits 1 and 4 of status register 212 are set. This means an invalid configuration between resource_1 and resource_4 were identified by the discrete hardware logic or ROM firmware 208.

FIG. 3b is a second embodiment of an exemplary invalid configuration detection resource 200. Instead of monitoring system registers by resource, in this embodiment, the invalid configuration detection resource 200 groups all monitored system resource registers together. FIG. 3b shows the system resource registers 340 as a continuous list or grouping of registers.

First, any group of system resource registers 350 and 352 may be selected from the system resource registers 340. Although two registers 350 and 352 are shown, the ellipses indicate that the discrete hardware logic or ROM firmware 208 can accept any number of registers for scrutiny as improper combinations. Within the discrete hardware logic or ROM firmware 208 is a list or grouping of improper combinations 252. Each item in the list of improper combinations 252 represents an invalid configuration, which the discrete hardware logic or ROM firmware 208 compares to the registers 350 and 352 that are received as inputs. In this illustration, each item in the list of improper combinations 252 is coupled to a status register 212, which is the output of the discrete hardware logic or ROM firmware 208. Other couplings of improper combinations 252 to status register 212 are possible as well. As FIGS. 2a and 2b demonstrate, the discrete hardware logic or ROM firmware 208 may be hardware, firmware, or some other logic which compares the registers 350 and 352 to some predetermined invalid configuration.

Figure 4A:
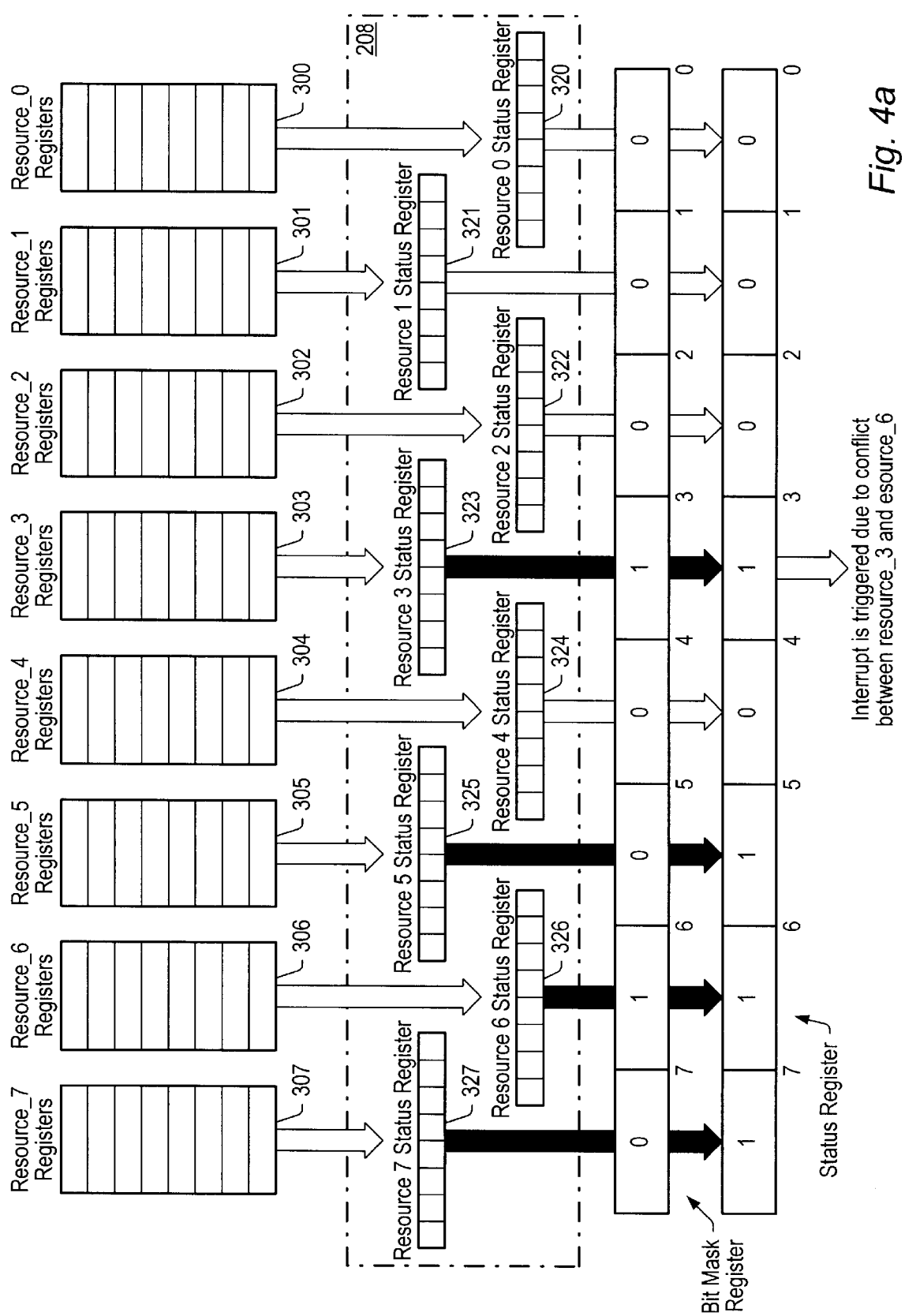
FIG. 4a is a functional block diagram illustrating how the bit mask register of the invalid configuration detection resource of FIG. 1 works according to one embodiment of the present invention.
Figure 4B:
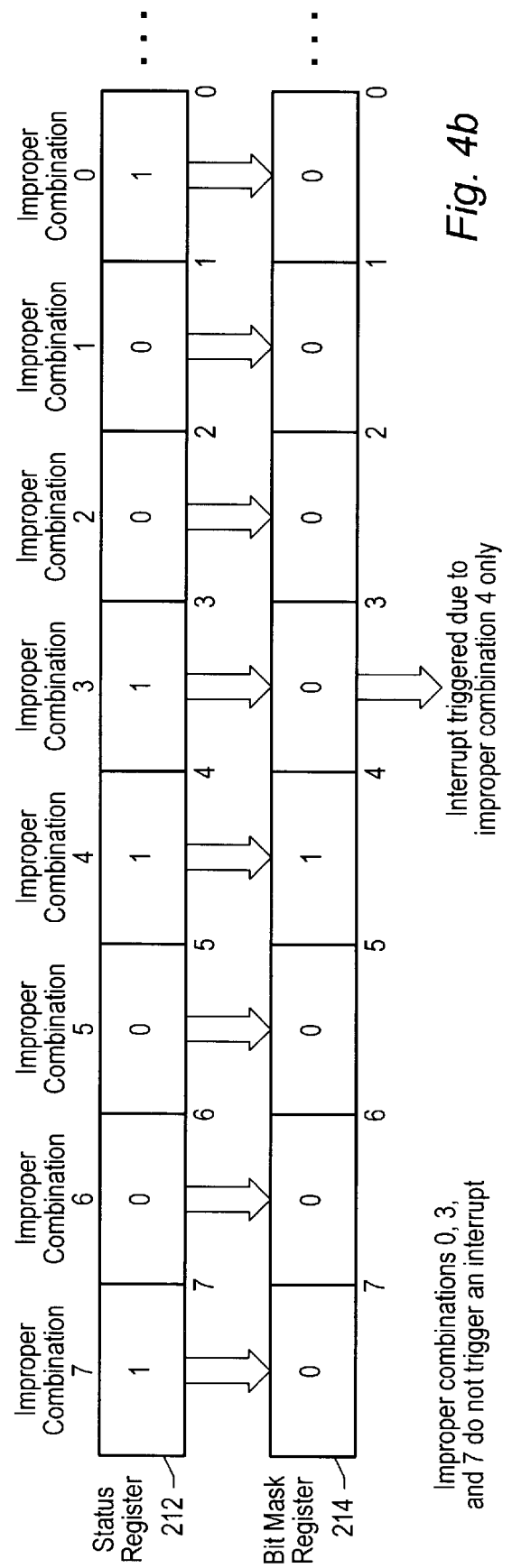
FIG. 4b is a functional block diagram illustrating how the bit mask register of the invalid configuration detection resource of FIG. 1 works according to a second embodiment of the present invention.

FIGS. 4a and 4b are two functional block diagrams, each illustrating how the bit mask register 214 of the invalid configuration detection resource 200 may be used to trigger a processor interrupt due to an invalid configuration within microcontroller M. In the embodiment of FIG. 4a, eight system resources are shown, with each resource having resource registers 300–307. However, the invalid configuration detection resource 200 can support any number of resources as well as any number of registers.

Each set of resource registers 300–307 is coupled to one resource status register 320–327. For example, resource_3 registers 303 are coupled to resource_3 status register 323. As shown and described in connection with FIG. 3a, resource_3 status register 323 may contain a value representing one of many possible resource_3 configurations. Or, resource_3 status register 323 may contain a value representing an externality, or invalidly configured register outside resource_3. Resource_3 status register 323 may instead contain a unique set bit for each possible invalid configuration of resource_3. As noted in the discussion of the status register 212 of the invalid configuration detection resource 200, above, resource_3 status register 323 may retain status information concerning resource_3 in a variety of other ways.

The eight resource status registers 320–327 are each coupled to a corresponding bit in status register 212. As described in FIG. 3a, the discrete hardware logic or ROM firmware 208 may process all of the resource status registers 320–327, and may update status register 212 accordingly. For example, an invalid configuration in any one of the resource status registers 320–327 may set a corresponding bit in the status register 212, as was illustrated in FIG. 3a.

The bit mask register 214 is an additional tool for the system debugger provided by the invalid configuration detection resource 200. In FIG. 4a, bits 3 and 6 of the bit mask register 214 are set. Bits 3, 5, 6, and 7 of the status register 212 are set, which are associated with resource_3, resource_5, resource_6, and resource_7, respectively. These bits were set as the result of values found to be invalid by the invalid configuration detection resource 200 in resource_3 status register 323, resource_5 status register 325, resource_6 status register 326, and resource_7 status register 327, respectively.

How the bit mask register 214 is used depends upon how the status registers are implemented. As discussed above, the status registers can be used to encode information in a variety of ways, whether in terms of resources or not. In FIG. 4a, the bit mask register 214 is initialized such that, when a conflict between the resources associated with the set bits occurs, a processor interrupt results. For example, by setting bits 3 and 6 of bit mask register 214, the system debugger may cause a processor interrupt to be triggered whenever a conflict between resource_3 and resource_6 occurs.

There are other ways that bit mask register 214 can be implemented. For example, bit mask register 214 could contain a value wherein that same value in any of the resource status registers 320–327 triggers an interrupt.

FIG. 4b is a functional block diagram illustrating another implementation of the bit mask register 214 of the invalid configuration detection resource 200. Again, the bit mask register 214 may be used by the system debugger to trigger a processor interrupt. By supporting a bit mask register 214, the invalid configuration detection resource 200 provides real-time status capability for a system debugger.

In this embodiment, each bit of the status register 212 represents an improper combination. The status register 212 bit may be set due to the discrete hardware logic or ROM firmware 208 which identifies each improper combination, as described in conjunction with FIG. 2a. Alternatively, the status register 212 bit may be set due to a program 206 that compares the resource registers to a table of invalid configurations 209, as described in conjunction with FIG. 2b. In this embodiment, the bit mask register 214 requires only a single bit to be set:in order for an interrupt to be triggered, in contrast to the embodiment illustrated by FIG. 4a.

FIG. 4b shows that bit 4 of bit mask register 214 is set. This triggers an interrupt due to improper combination 4. In status register 212, in addition to bit 4 being set, bits 0, 3, and 7 are also set. However, improper combinations 0, 3, and 7 do not trigger an interrupt. Only improper combination 4 triggers an interrupt. This feature provides the system debugger with the capability to select which invalid configurations merit attention, adding to the flexibility of the invalid configuration detection resource 200.

Thus, the invalid configuration detection resource provides an efficient tool for identifying conflicts between resources in a microcontroller. The invalid configuration detection resource permits a system software debugger to systematically identify and specify problems in the system in order to simplify the debug process. By automating the detection of conflicts between registers of different resources within a microcontroller, the invalid configuration detection resource enables each software debugger to remain focused on optimization of that resource. Using a bit mask register, a processor interrupt can be triggered when certain conflicts between system registers are identified by the invalid configuration detection resource. An invalid configuration port facilitates access to the invalid configuration detection resource. It should be understood that a variety of gating circuitry and compare circuitry may be utilized between units of the invalid configuration detection resource.

While the disclosed embodiments present certain techniques with which register conflicts are indicated, a variety of other techniques could be implemented within the spirit of the invention. For example, the status registers could be accessed over the invalid configuration port 140, but could also be accessed by the processor 104 over the bus 100, for example. The status registers could also be part of a scan chain. Further, although the disclosed embodiments employ status registers, status registers are not strictly necessary. Instead, the invalid configuration detection resource can monitor for any change in a monitored system register, any write to a monitored system register, or even any access of a monitored system register. The invalid configuration detection resource can then trigger a processor interrupt when the change, write, or access occurs. It should be understood that ways for holding values to indicate system register conflicts other than status registers are possible. It should further be understood that ways for generating values to indicate system register conflicts other than combinatorial logic or firmware are possible. Also, a single system resource register could be coupled to multiple status register bits, or multiple system resource registers could be coupled to a single status register bit. A variety of other techniques can similarly be employed.

The foregoing disclosure and description of the preferred embodiment are illustrative and explanatory thereof Various changes in the components, circuit elements, register monitoring, conflict reporting techniques, masking techniques, signals, and registers, as well as in the details of the illustrated circuitry and construction and method of operation may be made without departing from the spirit of the invention.

We claim:

1. A microcontroller adapted for identifying conflicts between a plurality of system registers, comprising:
   a system bus;
   a processor coupled to the system bus;
   a plurality of resources coupled to the system bus, wherein each resource of the plurality of resources includes a plurality of system registers;
   and an invalid configuration detection resource coupled to the plurality of resources, comprising:
      at least one status register coupled to the plurality of system registers, the status register including a plurality of bits for transitioning to a predetermined state in response to the occurrence of a conflict between the plurality of system registers; and
      a plurality of bit mask registers, each bit in a bit mask register of the plurality of bit mask registers being coupled to the status register or registers.

2. The microcontroller of claim 1, the invalid configuration detection resource further comprising:
   latch logic for maintaining states of register bits within the invalid configuration detection resource.

3. The microcontroller of claim 1, the invalid configuration detection resource further comprising:
   reset logic for resetting the plurality of bits of the status register.

4. The microcontroller of claim 3, further comprising:
   an invalid configuration port allowing each register in the invalid configuration detection resource to be accessible by an external system.

5. The microcontroller of claim 4, wherein the reset logic is programmed via the invalid configuration port of the microcontroller.

6. The microcontroller of claim 1, wherein a bit in the bit mask register being set coupled with a bit in a corresponding status register being set causes the processor to interrupt operation.

7. The microcontroller of claim 1, further comprising:
   a read-only memory coupled to the system bus; and
   a memory coupled to the system bus;
wherein the invalid configuration detection resource further comprises:
   a table stored in memory that contains invalid combinations of system registers;
   a program stored in read-only memory that compares the table to the system registers; and
   a plurality of status registers accessible to the program for encoding a result of the comparison.

8. A method for detecting invalid configurations between a plurality of system registers in a microcontroller, the method comprising the steps of:
   monitoring selected system registers;
   determining when a first system register value conflicts with a second system register value;
   setting a status register to a predetermined value in response to the conflict between the selected registers;
   coupling status registers to bit mask registers for monitoring a selected bit of the status register; and
   triggering processor interrupts when both a selected bit in the bit mask register is set and a corresponding bit in the status register is set.

9. The method of claim 8, further comprising the steps of:
   monitoring register values within a resource; and
   setting a resource-specific status register to a predetermined value in response to a configuration of the register values within the resource.

10. The method of claim 8, further comprising the steps of:
    monitoring register values within a selected system resource;
    monitoring selected register values outside the selected system resource; and
    setting a resource-specific status register to a predetermined value in response to a conflict between registers within the selected system resource and registers outside the selected system resource.

11. A microcontroller adapted for preventing conflicts between a plurality of system registers, comprising:
    a system bus;
    a processor coupled to the system bus;
    a plurality of resources coupled to the system bus, wherein each resource of the plurality of resources includes a plurality of system registers;

a read-only memory coupled to the system bus;
a memory coupled to the system bus; and
an invalid configuration detection resource coupled to the plurality of system registers, comprising:
    a table stored in memory that contains invalid combinations of system registers;
    intercept logic that intercepts a write to the plurality of system registers to an intercept register;
    a program stored in read-only memory that compares the table to a value in the intercept register.

* * * * *